United States Patent [19]

Sakurai et al.

[11] Patent Number: 5,616,627
[45] Date of Patent: Apr. 1, 1997

[54] POLYPROPYLENE RESIN COMPOSITION, POLYPROPYLENE RESIN FOAMED MATERIAL AND PROCESS FOR PRODUCING THE SAME

[75] Inventors: Tadashi Sakurai, Kyoto; Kouichirou Asao; Akinobu Sakamoto, both of Osaka, all of Japan

[73] Assignee: Sumitomo Chemical Company, Limited, Osaka, Japan

[21] Appl. No.: 502,880

[22] Filed: Jul. 17, 1995

[30] Foreign Application Priority Data

Jul. 15, 1994 [JP] Japan .................... 6-164187
Dec. 26, 1994 [JP] Japan .................... 6-322841

[51] Int. Cl.$^6$ .................................... C08J 9/10
[52] U.S. Cl. ........................... 521/134; 521/94
[58] Field of Search ........................ 521/134, 94

[56] References Cited

U.S. PATENT DOCUMENTS 3,608,009  9/1971  Changani ...................... 521/134
3,846,349  11/1974  Harada et al. ................. 521/134
4,510,031  4/1985  Matsumura et al. ............. 521/134

OTHER PUBLICATIONS

JP-A-54-3874, Jan. 1979 (Derwent Abstracts).
JP-A-55-31807, Mar. 1980 (Derwent Abstracts).
JP-A-55-31808, Mar. 1980 (Derwent Abstracts).

*Primary Examiner*—Morton Foelak
*Attorney, Agent, or Firm*—Cushman Darby & Cushman IP Group of Pillsbury Madison & Sutro, LLP

[57] ABSTRACT

The present invention relates to a polypropylene resin composition containing about 90 to 60 parts by weight of a polypropylene block copolymer (A); and about 10 to 40 parts by weight of a polyethylene resin (B), wherein the polypropylene block copolymer is a polypropylene block copolymer which contains about 99 to 90% by weight of a crystalline polypropylene (a) and about 1 to 10% by weight of an amorphous ethylene-α-olefin copolymer (b) and has a melt flow rate (MFR) of about 2 to 15 g/10 minutes, and a die swell ratio, measured by a capillary rheometer, of at least 1.7. Foamed materials containing a fine and uniform foam are obtainable from this composition.

10 Claims, No Drawings

POLYPROPYLENE RESIN COMPOSITION, POLYPROPYLENE RESIN FOAMED MATERIAL AND PROCESS FOR PRODUCING THE SAME

BACKGROUND OF THE INVENTION

1. Field of the Invention

The present invention relates to a polypropylene resin composition which is suitable for producing a foamed material containing a fine and uniform foam, and a polypropylene resin foamed material comprising the same.

2. Related Background Art

Japanese Patent Kokai No. 55-31807 discloses a thermoplastic polyolefin resin composition comprising 50 to 80% by weight of a polypropylene having an isotactic index of at least 90%, a melt index of 0.5 to 15, 5 to 40% by weight of a high-density polyethylene (0.94–0.97 g/cm$^{-3}$), 5 to 25% by weight of a low-density polyethylene (0.91–0.93 g/cm$^{-3}$) and 0 to 5% by weight of an EP rubber. A foaming agent is added, and the resultant mixture is extruded and foamed. However, the resin composition disclosed by this prior art does not have satisfactory gas retention at the time of extrusion foaming, and it is difficult to obtain a satisfactory polypropylene resin foamed material containing a fine and uniform foam even if such a resin composition is used.

In order to obtain a polypropylene resin foamed material containing a fine and uniform foam it is necessary that the polypropylene resin composition to be extrusion foamed have superior gas retention at the time of molding. A number of efforts have been made to resolve the long standing need for a fine and uniform polypropylene material. However, these known efforts have fallen short, and it is still an objective in the art to develop a polypropylene resin composition having superior gas retention for extrusion foam molding.

SUMMARY OF THE INVENTION

The present inventors have studied intensively in order to develop a polypropylene resin composition which is superior in gas retention. As a result, they have discovered that a polypropylene resin composition containing a polypropylene block copolymer having a specific composition and melt properties exhibits the long sought superior gas retention characteristic, and that a foamed material containing a fine and uniform foam can be obtained when using this resin composition.

The present polypropylene resin composition comprises about 90 to 60 parts by weight of a polypropylene block copolymer (A) and about 10 to 40 parts by weight of a polyethylene resin (B), wherein the polypropylene block copolymer (A) is a polypropylene block copolymer which contains 99 to 90% by weight of a crystalline polypropylene (a) and 1 to 10% by weight of an amorphous ethylene-α-olefin copolymer (b) and has the melt properties of a melt flow rate (MFR) of about 2 to 15 g/10 minutes, and a die swell ratio measured by a capillary rheometer of at least 1.7. The present invention also provides a foamed material containing a fine and uniform foam comprised of the foamed polypropylene resin composition.

Since the polypropylene resin composition of the present invention is superior in gas retention, a foamed material containing a fine and uniform foam can be stably produced on an industrial scale by using the polypropylene resin composition.

DESCRIPTION OF THE PREFERRED EMBODIMENT

The polypropylene resin composition of the present invention comprises about 90 to 60 parts by weight of a polypropylene block copolymer (A), and 10 to 40 parts by weight of a polyethylene resin (B), wherein the polypropylene block copolymer (A) is a polypropylene block copolymer which contains about 99 to 90% by weight of a crystalline polypropylene (a) and about 1 to 10% by weight of an amorphous ethylene-α-olefin copolymer (b) and has the melt properties of a melt flow rate (MFR) of about 2 to 15 g/10 minutes, and a die swell ratio measured by a capillary rheometer of at least 1.7.

The polypropylene block copolymer (A) in the present invention includes a polymer wherein the amorphous ethylene-α-olefin copolymer (b) is dispersed in the crystalline polypropylene (a), and a copolymer wherein the crystalline polypropylene (a) and the amorphous ethylene-α-olefin copolymer (b) are chemically bonded. The former is normally used.

A polypropylene block copolymer (A) can be industrially produced by processes known to those skilled in the art, such as the process described in Japanese Patent Kokai No. 61-69823. For instance, according to this known process a propylene crystalline polymer or copolymer can be prepared in the presence of a catalyst consisting of (1) a solid Ti catalyst component containing, as essential components, the reaction product of a magnesium compound, a titanium compound and an electron donor; (2) an alkylaluminum catalyst component which is halogen-free; and (3) an organosilicon catalyst component with Si—O—C or Si—N—C bond(s). Propylene can be randomly copolymerized in the presence of another α-olefin and said catalyst at a molar ratio of 10:90 to 90:10 in the presence of a crystalline propylene polymer. A compound having a metal-OC bond wherein the metal is B, Mg, Al, Ti, Zr, Li, Zn or Ca is added to the random copolymerization system at the ratio of 40–1000 moles to 1 gram atom of Ti in (1). The compound having a metal-OC bond can be represented by the formula $M(OR)_n R^3{}_{1-m}$ wherein R is a hydrocarbon group and $R^3$ is H, halogen or a hydrocarbon group.

The crystalline polypropylene (a) can be copolymerized with a small amount of a copolymerizable component such as ethylene, α-olefin, and the like (other than propylene), unless the crystallizability is adversely affected. Exemplary copolymerizable components include 1-butene, 4-methylpentene-1, 1-hexene, 1-octene and the like.

Regarding the amorphous ethylene-α-olefin copolymer (b), the weight ratio of the ethylene to the other α-olefin is not specifically limited if the copolymer (b) is amorphous. By preference, the weight ratio of the ethylene to the α-olefin is within a range of about 20:80 to 80:20, and is preferably within a range of about 30:70 to 60:40. Exemplary α-olefins include propylene, 1-butene, 4 methylpentene-1, 1-hexene, 1-octene and the like.

In the present invention, the weight ratio of the above component (a) to the component (b) is within a range of about 99:1 to 90:10, and preferably is about 98:2 to 92:8. When the weight ratio exceeds about 99:1, the impact resistance of the resulting foamed material obtained from the resin composition decreases. On the other hand, when the weight ratio is less than about 90:10, the gas retention of the resin composition decreases.

The melt flow rate (MFR) of the polypropylene block copolymer (A) comprising the crystalline polypropylene (a) and the amorphous ethylene-α-olefin copolymer (b) must be within a range of about 2 to 15 g/10 minutes, and is preferably about 3 to 10 g/10 minutes. In the present invention, the MFR of the polypropylene block copolymer (A) is a value measured at a temperature of 230° C. under a load of 2.16 kgf according to JIS K7210. When the MFR is less than 2 g/10 minutes, the screw shear stress during extrusion molding generates exothermic heat which increases the resin temperature and degasses the resin. It therefore becomes difficult to obtain a foamed material having a predetermined density. On the other hand, the impact resistance of the resulting foamed material deteriorates when the MFR exceeds 15 g/10 minutes.

It is necessary that the die swell ratio measured by a capillary rheometer of the polypropylene block copolymer (A) is not less than about 1.7, and is preferably 1.7 to 3. When the die swell ratio is less than about 1.7, the gas retention is low and degassing occurs during extrusion molding and, therefore, a finely and uniformly foamed material can not be obtained. The die swell ratio in the present invention is a value measured at a temperature of 185° C. and at a shear rate of 121 sec$^{-1}$ using a capillary having a length (l) of 20 mm, a diameter (d) of 1 mm and a flow-in angle of 0 (flat) according to JIS K7199.

The polyethylene resin (B) can be suitably selected from among low-density polyethylene, high-density polyethylene, ethylene-α-olefin copolymer, ethylene-vinyl acetate copolymer, and the like, according to the low-temperature processability at the time of extrusion foaming, and the physical properties to be required for the foamed material (e.g. rigidity, impact resistance, etc.). By preference, the polyethylene resin has a MFR of about 0. 1 to 20 g/10 minutes, and preferably has a MFR of about 0. 1 to about 10g/10 minutes. Among them, it is particularly preferred to use an ethylene-α-olefin copolymer having a density of 0.86 to 0.905 g/cm$^3$ alone, or an ethylene-α-olefin copolymer having a density of 0.86 to 0.905 g/cm$^3$ in combination with a high-density polyethylene having a density of 0.94 to 0.97 g/cm$^3$ at a weight ratio of the ethylene-α-olefin copolymer to the high-density polyethylene within a range of about 40:60 to 100:0, and preferably within a range of about 60:40 to 100:0, in view of the rigidity and impact resistance of the foamed material. In this case, a particularly preferred ethylene-α-olefin copolymer has a MFR of 0.1 to 10 g/10 minutes and a density of 0.86 to 0.89 cm$^3$. In the present invention, the MFR of the polyethylene resin is a value measured at a temperature of 190° C. and at a load of 2.16 kgf according to JIS K7210.

The weight ratio of the ethylene to the α-olefin and kind of the α-olefin of the ethylene-α-olefin copolymer to be used as the polyethylene resin (B) are not specifically limited. The weight ratio of the ethylene to the α-olefin is preferably within a range of about 90:10 to 40:60, and more preferably is within a range of 90:10 to 60:40. Exemplary α-olefins include propylene, 1-butene, 4-methyl-pentene-1, 1-hexene, 1-octene, and the like.

The polypropylene resin composition of the present invention comprises the polypropylene block copolymer (A) and the polyethylene resin (B), and the weight ratio of the component (A) to the component (B) is within a range of about 90:10 to 60:40, and is preferably within a range of 85:15 to 65:35. When the weight ratio exceeds about 90:10, a foamed material having an uniform foam can not be stably produced because the processability at the time of foaming molding deteriorates, and the low-temperature processability at the time of extrusion molding and impact resistance of the resulting foamed material deteriorate. On the other hand, when the weight ratio is less than about 60:40, a foamed material containing an uniform foam can not be stably produced because the processability at the time of foaming molding deteriorates, and the rigidity, heat resistance and hinge characteristics of the resulting foamed material deteriorate.

In addition to the polypropylene block copolymer (A) and the polyethylene resin (B), the polypropylene resin composition of the present invention can also contain a foaming agent. Further, various additives such as foaming assistants, primary and secondary antioxidants, ultraviolet absorbers, antistatic agents, pigments, filler, etc. can be added to the polypropylene resin composition of the present invention, if necessary, unless the effect of the present invention is adversely affected.

The polyolefin resin composition of the present invention can be produced by mixing the polypropylene block copolymer (A) and the polyethylene resin (B) in the predetermined weight ratio and any required additives using a tumbler, and melt-kneading the mixture using an extruder.

A process for producing a polypropylene resin foamed material comprises the steps of:

(I) preparing a foamable polypropylene resin composition by melt-kneading about 90 to 60 parts by weight of a polypropylene block copolymer (A) which contains about 99 to 90% by weight of a crystalline polypropylene (a) and about 1 to 10% by weight of an amorphous ethylene-α-olefin copolymer (b) and has the melt properties of a MFR of about 2 to 15 g/10 minutes, and a die swell ratio measured by a capillary rheometer of at least about 1.7, about 10 to 40 parts by weight of a polyethylene resin (B) and a foaming agent; and (II) foaming the polypropylene resin composition obtained in the step I.

The kind of the foaming agent to be used in the present invention is not specifically limited. For example, foaming agents include pyrolytic foaming agents which are decomposed by heating to generate a gas, pneumatogens (evaporation type foaming agents) and the like. Exemplary pyrolytic foaming agents include azodicarbonamide, oxybenzene sulfonyl hydrazide, azobisisobutyronitrile, barium azodicarbonate, and hydrazodicabonamide and the like. Pneumatogens include heptane, hexane, dichloroethane and the like. Among the foaming agents, pyrolyric foaming agents, particularly azodicarbonamide, are preferred. In general, it is preferred to use a foaming agent having a decomposition temperature of about 160° C. to 180° C. A foaming agent having a decomposition temperature exceeding about 180° C. can be suitably used in combination with a foaming assistant in combination to decrease the decomposition temperature to not more than about 180° C. Further, it is preferred to use a foaming agent which exhibits endothermic decomposition behavior, such as sodium bicarbonate, in order to prevent an uneven foam from forming by the exothermic heat at the time of the decomposition of the foaming agent.

In the present invention, the amount of the foaming agent to be added is calculated from the amount of the gas required to obtain a desired density of the foamed material, according to the kind of the foaming agent. Since the polypropylene resin composition to be used in the present invention has superior gas retention, the amount of the foaming agent required to obtain a desired density of the foamed material can be based on the result of a stoichiometric calculation depending on the kind of the foaming agent selected. The density of the polyolefin resin foamed material is preferably within a range of about 0.2 to 0.7 g/cm$^3$, and foaming the polyolefin resin composition of the present invention can yield a foamed material having such a density by adjusting the amount of the foaming agent to be added.

The following two embodiments show preferred embodiments of the step I. In the first embodiment, the polypropylene block copolymer (A) is mixed with the polyethylene resin (B) and, after the mixture is melt-kneaded at a temperature higher than a melting temperature of the components (A) and (B), a foaming agent is further added, followed by additional melting and kneading. In the second embodiment, the polypropylene block copolymer (A), the polyethylene resin (B) and foaming agent are mixed and the mixture is melt-kneaded. In both cases, the resulting polyolefin resin composition is normally supplied to the foaming step.

In step II the polyolefin resin composition prepared in the step I is foamed and molded by a known method to produce a polypropylene foamed material which contains a fine and uniform foam and has a desired shape. For example, a so-called "extrusion foaming process" is preferably used to produce sheet-like foamed material. This technique involves extruding a polypropylene resin composition with an extruder equipped with a T-die or a circular die, and then molding the material in a sheet-like form and foaming, simultaneously, to yield a foamed material having a predetermined density. The thickness of the sheet is not specifically limited, with this technique, but is usually about 1 to 10 mm. The resin temperature at the time of extrusion foaming is preferably within a range of about 160° C. to 180° C. The polypropylene resin foamed material thus obtained is characterized as a fine and uniform foam, and is comprised of a polypropylene resin composition comprised of about 90 to 60 parts by weight of a polypropylene block copolymer (A), and about 10 to 40 by weight of a polyethylene resin (B), wherein the polypropylene block copolymer is a polypropylene block copolymer which contains about 99 to 90% by weight of a crystalline polypropylene (a) and about 1 to 10% by weight of an amorphous ethylene-α-olefin copolymer (b) and has these melt properties: a melt flow rate (MFR) of about 2 to 15 g/10 minutes, and a die swell ratio measured by a capillary rheometer of at least about 1.7. A polypropylene composition suitable for foaming is described in Japanese Application 164187/1994 filed Jul. 15, 1994 and in Japanese Application 322841/1994 filed Dec. 26, 1994, the complete disclosures of which are incorporated herein by reference.

As described above, the polypropylene resin composition of the present invention is superior in gas retention, and a polypropylene foamed article containing a fine and uniform foam can be produced when using the composition. Further, the polypropylene resin composition of the present invention containing a specific polyethylene resin can afford a polyolefin resin foamed material which has superior mechanical physical properties such as impact resistance, and the like.

EXAMPLES

The following Examples further illustrate the present invention without limiting its scope.

The MFR was measured according to JIS K7210. The measuring conditions are as follows:

Polypropylene block copolymer: temperature: 230° C., load: 2.16 kgf

Polyethylene resin: temperature: 190° C., load: 2.16 kgf

The die swell ratio (measured by capillary rheometer) was measured according to JIS K7199. The measuring conditions are as follows:

Capillary: length: 20 mm, diameter: 1 mm, flow-in angle: 0 (flat), measuring temperature: 185° C., shear rate: 121 sec$^{-1}$ The bending modulus was measured according to JIS K7203. The measuring conditions are as follows:

Test piece: 50×100 mm, bending rate: 10 mm/minute

Span length: 50 mm

The Du Pont impact strength was determined as follows. An impact force was applied to a test piece (100 mm×100mm) using an impact deformation process testing machine (process B) described in JIS K5400 and a 50% fracture energy was measured by the method described in JIS K7211. The resulting value was taken as the Du Pont impact strength.

In the Examples, the abbreviations VLDPE means very low density polyethylene, HDPE means high density polyethylene, and ULDPE means ultra low density polyethylene.

EXAMPLE 1

70 parts by weight of a polypropylene block copolymer (A1) which comprised 95% by weight of a crystalline polypropylene (a) and 5% by weight of an amorphous ethylene-propylene copolymer (b) (weight ratio of ethylene to propylene of 40:60), MFR: 6 g/10 minutes, die swell ratio (measured by capillary rheometer) of 1.9; 20 parts by weight of an ethylene-1-butene copolymer (B1) (VLDPE: MFR: 2 g/10 minutes, density: 0.900 g/cm$^3$) and 10 parts by weight of a high-density polyethylene (B2) (HDPE; MFR of 5 g/10 minutes, density of 0.950 g/cm$^3$) were mixed with a tumbler, and the mixture was melt-kneaded (at a cylinder and die temperature of 220° C., a screw rate of 40 rpm) using a 90 mmφ extruder equipped with a strand die to obtain a polypropylene resin composition. To 100 parts by weight of the polypropylene resin composition, 1.2 parts by weight of azodicarbonamide and 0.6 parts by weight of basic zinc carbonate were added and mixed with a tumbler, and the resultant mixture was subjected to extrusion foaming at a cylinder temperature of 160° C. and a die temperature of 170° C., and at a screw rate of 40 rpm using a 90 mmφ extruder equipped with a 1200 mm T-die to give a 4 mm thick foamed sheet having a density of 0.3 g/cm$^3$. The foamed sheet exhibited superior impact resistance and contained a fine and uniform foam.

EXAMPLE 2

A foamed sheet was prepared according to Example 1, except that (A1) was replaced with a polypropylene block copolymer (A2) comprised of 95% by weight of a crystalline polypropylene (a) and 5% by weight of an amorphous ethylene-propylene copolymer (b) (a weight ratio of ethylene to propylene of 40:60), and which had a MFR of 10 g/10 minutes and a die swell ratio (measured by capillary rheometer) of 1.75. The foamed sheet was 4 mm thick and had a density of 0.3 cm$^3$. The foamed sheet exhibited superior impact resistance and had a fine and uniform foam structure.

EXAMPLE 3

A foamed sheet which was prepared according to Example 1, except that 80 parts by weight of a polypropylene block copolymer and 20 parts by eight of an ethylene-propylene copolymer (B3) (ULDPE; MFR of 1 g/10 minutes, density of 0.87 g/cm$^3$) was used as the polyethylene resin. The foamed sheet was 4 mm thick and had a density of 0.3 g/cm$^3$. The foamed sheet exhibited superior impact resistance and had a fine and uniform foam structure.

EXAMPLE 4

A foamed sheet was prepared according to Example 1, except that 20 parts by weight of an ethylene-propylene copolymer (B3) (ULDPE: MFR of 1 g/10 minutes, density of 0.87 g/cm$^3$) and 10 parts by weight of a high-density polyethylene (B2) (HDPE: MFR of 5 g/10 minutes, density of 0.95 g/cm$^3$) were used as the polyethylene resin. The foamed sheet was 4 mm thick and had a density of 0.3 g/cm$^3$. The foamed sheet exhibited superior impact resistance and contained a fine and uniform foam.

EXAMPLE 5

A foamed sheet was prepared according to Example 1, except that 80 parts by weight of a polypropylene block copolymer (A3) comprised of 97% by weight of a crystalline polypropylene (a) and 3% by weight of an amorphous ethylene-propylene copolymer (b) (weight ratio of ethylene to propylene of 40:60) and which had a MFR of 8 g/10 minutes, and a die swell ratio (measured by capillary rheometer) of 1.9 was used as the polypropylene block copolymer, and 20 parts by weight of an ethylene propylene copolymer (B3) (ULDPE: MFR: 1 g/10 minutes, density: 0.87 g/cm$^3$) was used as the polyethylene resin. The foamed sheet was 4 mm thick, exhibited superior impact resistance, and, contained a fine and uniform foam.

EXAMPLE 6

A foamed sheet having a thickness of 4 mm, a density of 0.3 g/cm$^3$, exhibiting superior impact resistance and containing a fine and uniform foam was prepared according to Example 1, except that 65 parts by weight of a polypropylene block copolymer (A 1) was used as the propylene block copolymer and 15 parts by weight of an ethylene propylene copolymer (B3) and 20 parts by weight of a high-density polyethylene (B2) were used as the polyethylene resin.

Comparative Example 1

An extrusion foaming molding was conducted according to Example 1 except for using a polypropylene block copolymer (A4) comprised of 95% by weight of a crystalline polypropylene (a) and 5% by weight of an amorphous ethylene-propylene copolymer (b) (weight ratio of ethylene to propylene of 40:60), and which had a MFR of 6 g/10 minutes, a die swell ratio (measured by capillary rheometer) of 1.6 instead of the polypropylene block copolymer (A1). However, degassing occurred at the time of extrusion foaming. A foamed sheet (thickness: 2 mm, density: 0.8 g/cm$^3$) was obtained.

Comparative Example 2

An extrusion foaming molding was conducted according to Example 1, except for using 65 parts by weight of a polypropylene block copolymer (A5) comprised of 85% by weight of a crystalline polypropylene (a) and 15% by weight of an amorphous ethylenepropylene copolymer (b) (weight ratio of ethylene to propylene of 40:60), and which had a MFR of 8 g/10 minutes and a die swell ratio (measured by capillary rheometer) of 1.65 as the polypropylene block copolymer, and 25 parts by weight of a low-density polyethylene (B4) (LDPE: a MFR of 1 g/10 minutes, a density of 0.92 g/cm$^3$) and 10 parts by weight of a high-density polyethylene (B5) (HDPE: a MFR of 0.4 g/10 minutes, a density of 0.955 g/cm$^3$) as the polyethylene resin. However, degassing occurred on the surface of the sheet at the time of extrusion foaming and a foamed sheet having a thickness of 4 mm and a density of 0.3 g/cm$^3$ was obtained. The foamed sheet contained an uneven foam having a average diameter of more than 1 mm, and had an inferior appearance.

EXAMPLE 7

A foamed sheet having a thickness of 2 mm and a density of 0.45 g/cm$^3$ and containing a fine and uniform foam was obtained according to the same manner as that described in Example 3, except that 0.6 parts by weight of azodicarbonamide was used as the foaming agent.

Comparative Example 3

An extrusion foaming molding was conducted according to Example 7, except that the polypropylene block copolymer (A1) was replaced with 80 parts by weight of a polypropylene block copolymer (A6) comprised of 95% by weight of a crystalline polypropylene (a) and 5% by weight of an amorphous ethylene-propylene copolymer (b) (weight ratio of ethylene to propylene of 40:60) which had a MFR of 6 g/10 minutes and a die swell ratio (measured by capillary rheometer) of 1.5. However, degassing occurred at the time of extrusion foaming and a sheet 1 mm thick and having a density of 0.8 g/cm$^3$ was obtained.

Comparative Example 4

An extrusion foaming method was conducted according to Example 3, except that the propylene block copolymer (A1) was replaced with a polypropylene block copolymer (A7) comprised of 95% by weight of a crystalline polypropylene (a) and 5% by weight of an amorphous ethylene-propylene copolymer (b) (weight ratio of ethylene to propylene of 40:60), which had a MFR of 1 g/10 minutes, and a die swell ratio (measured by capillary rheometer) of 1.9. However, degassing occurred at the time of extrusion foaming and a foamed sheet 2 mm thick having a density of 0.8 g/cm$^3$, was obtained.

Comparative Example 5

An extrusion foaming was conducted according to in Example 3, except that the polypropylene block copolymer (A 1 ) was replaced with a polypropylene block copolymer (A8) comprised of 95% by weight of a crystalline polypropylene (a) and 5% by weight of an amorphous ethylene-propylene copolymer (b) (weight ratio of ethylene to propylene of 40:60), and which had a MFR of 18 g/10 minutes, and a die swell ratio (measured by capillary rheometer) of 1.9. A foamed sheet (4 mm thick and having a density of 0.3 g/cm$^3$), containing a fine and uniform foam was obtained, but the impact resistance was low.

Comparative Example 6

An extrusion foaming molding was conducted according to Example 3, except that the resin composition was replaced with 95 parts by weight of the polypropylene block copolymer (A1) as the polypropylene block copolymer and 5 parts by weight of the ethylene-propylene copolymer (B3). A foamed sheet having a thickness of 4 mm, a density of 0.3 g/cm$^3$ and containing a fine and uniform foam was obtained, but the impact resistance was low.

Comparative Example 7

An extrusion molding was conducted according to Example 4, except that the polypropylene block copolymer was 55 parts by weight of a polypropylene block copolymer (A1), and the polyethylene resin composition was 35 parts by weight of an ethylene-propylene copolymer (B3) and 10 parts by eight of a high-density polyethylene (B2). A foamed sheet (thickness: 4 mm, density: 0.3 g/cm³) containing a fine and uniform foam was obtained, but the rigidity was low.

The result of Examples and Comparative Examples are shown in Table 1.

TABLE 1

| | | Composition of Resin | | | | | | |
|---|---|---|---|---|---|---|---|---|
| | | Block PPD (A) | | | | | PE(B) | |
| | | Content | | | | | | |
| | Symbol | Crystalline PP (a) (% by weight) | Amorphous EP(b) (% by weight) | MFR | Die Swell Ratio | Composition Ratio (parts by weight) | Symbol and Kind | Composition Ratio (parts by weight) |
| Example 1 | (A1) | 95 | 5 | 6 | 1.9 | 70 | (B1) VLDPE (B2) HDPE | 20 10 |
| Example 2 | (A2) | 95 | 5 | 10 | 1.75 | 70 | (B1) VLDPE (B2) HDPE | 20 10 |
| Example 3 | (A1) | 95 | 5 | 6 | 1.9 | 80 | (B3) ULDPE | 20 |
| Example 4 | (A1) | 95 | 5 | 6 | 1.9 | 70 | (B3) ULDPE (B2) HDPE | 20 10 |
| Example 5 | (A3) | 97 | 3 | 8 | 1.9 | 80 | (B3) ULDPE | 20 |
| Example 6 | (A1) | 95 | 5 | 6 | 1.9 | 65 | (B3) ULDPE (B2) HDPE | 15 20 |
| Comparative Example 1 | (A4) | 95 | 5 | 6 | 1.6 | 70 | (B1) VLDPE (B2) HDPE | 20 10 |
| Comparative Example 2 | (A5) | 85 | 15 | 8 | 1.65 | 65 | (B4) LDPE (B5) HDPE | 25 10 |
| Example 7 | (A1) | 95 | 5 | 6 | 1.9 | 80 | (B3) ULDPE | 20 |
| Comparative Example 3 | (A6) | 95 | 5 | 6 | 1.5 | 80 | (B3) ULDPE | 20 |
| Comparative Example 4 | (A7) | 95 | 5 | 1 | 1.9 | 80 | (B3 ULDPE) | 20 |
| Comparative Example 5 | (A8) | 95 | 5 | 18 | 1.9 | 80 | (B3 ULDPE) | 20 |
| Comparative Example 6 | (A1) | 95 | 5 | 6 | 1.9 | 95 | (B3) ULDPE | 5 |
| Comparative Example 7 | (A1) | 95 | 5 | 6 | 1.9 | 55 | (B3) ULDPE (B2) HDPE | 35 10 |

| | Foamed Sheet | | | | | |
|---|---|---|---|---|---|---|
| | (*) Whether Degassing Occurs or not at the time of molding | Density (g/cm³) | Thickness (mm) | Bending Modulus (kg/cm²) | Du Pont Impact Strength (kg/cm) 23° C. | −10° C. |
| Example 1 | o | 0.3 | 4 | 3400 | 35 | 18 |
| Example 2 | o | 0.3 | 4 | 3600 | 33 | 15 |
| Example 3 | o | 0.3 | 4 | 4200 | 38 | 20 |
| Example 4 | o | 0.3 | 4 | 4100 | 34 | 18 |
| Example 5 | o | 0.3 | 4 | 4600 | 32 | 25 |
| Example 6 | o | 0.3 | 4 | 4000 | 30 | 13 |
| Comparative Example 1 | x | 0.7 | 2 | — | — | — |
| Comparative Example 2 | ▲ | 0.3 | 4 | 3100 | 27 | 15 |
| Example 7 | o | 0.45 | 2 | 7200 | 20 | 10 |
| Comparative Example 3 | x | 0.8 | 1 | — | — | — |
| Comparative Example 4 | x | 0.8 | 2 | — | — | — |
| Comparative Example 5 | o | 0.3 | 4 | 4500 | 15 | 5 |
| Comparative Example 6 | o | 0.3 | 4 | 4100 | 12 | 4 |
| Comparative Example 7 | o | 0.3 | 4 | 2700 | 42 | 23 |

(*)Judgment of degassing: o means not degassed; ▲ means degassed; x means severe degassing

What is claimed is:

1. A process for producing a polypropylene resin foamed material, comprising the steps of:

(I) preparing a polypropylene resin composition by melt-kneading about 90 to 60 parts by weight of a polypropylene block copolymer (A) which contains about 99 to 90% by weight of a crystalline polypropylene (a) and about 1 to 10% by weight of an amorphous ethylene-α-olefin copolymer (b) and has the melt properties of a MFR of about 2 to 15 g/10 minutes, and a die swell ratio measured by a capillary rheometer of at least 1.7; 10 to 40 parts by weight of a polyethylene resin (B); and a foaming agent; and (II) foaming the polypropylene resin composition.

2. The process according to claim 1, wherein the polypropylene block copolymer (A) is a polymer in which the amorphous ethylene-α-olefin copolymer (b) is dispersed in the crystalline polypropylene (a).

3. The process according to claim 1, wherein the polyethylene resin (B) is a resin of an ethylene-α-olefin copolymer, or a resin of an ethylene-α-olefin copolymer and a high-density polyethylene.

4. The process according to claim 1, wherein the polyethylene resin is a resin of an ethylene-α-olefin copolymer having a density of 0.86 to 0.905 g/cm³, or a resin of an ethylene-α-olefin copolymer having a density of 0.86 to 0.905 g/cm³ and a high-density polyethylene having a density of 0.94 to 0.97 g/cm³.

5. The process according to claim 1, wherein the foaming agent is azodicarbonamide.

6. A foamed polypropylene resin material wherein the polypropylene resin comprises:

about 90 to 60 parts by weight of a polypropylene block copolymer (A), and about 10 to 40 parts by weight of a polyethylene resin (B), wherein the polypropylene block copolymer is a polypropylene block copolymer which contains about 99 to 90% by weight of a crystalline polypropylene (a) and about 1 to 10% by weight of an amorphous ethylene-α-olefin copolymer (b) and has the melt properties of a melt flow rate of about 2 to 15 g/10 minutes, and a die swell ratio measured by a capillary rheometer of at least 1.7.

7. The polypropylene resin foamed material according to claim 6, wherein the polypropylene block copolymer (A) is a polymer in which the amorphous ethylene-α-olefin copolymer (b) is dispersed in the crystalline polypropylene (a).

8. The polypropylene resin foamed material according to claim 6, wherein the polyethylene resin (B) is a resin of an ethylene-α-olefin copolymer, or a resin of an ethylene-α-olefin copolymer and a high-density polyethylene.

9. The polypropylene resin foamed material according to claim 6, wherein the polyethylene resin (B) is a resin of an ethylene-α-olefin copolymer having a density; of 0.86 to 0.905 g/cm³, or a resin of an ethylene-α-olefin copolymer having a density of 0.86 to 0.905 g/cm³ and a high density polyethylene having a density of 0.94 to 0.97 g/cm³.

10. The polypropylene resin foamed material according to claim 6, wherein said polypropylene resin foamed material has a density within a range of about 0.2 to 0.7 g/cm³.

* * * * *